Figure 1:
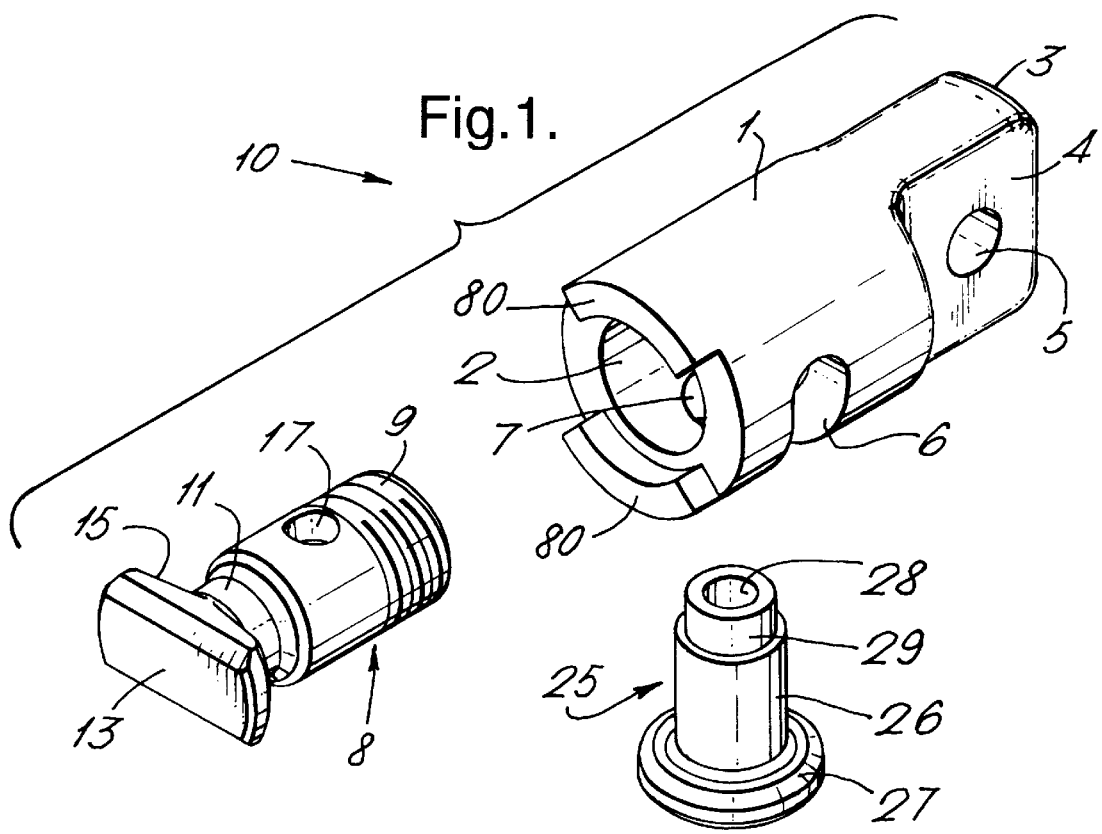

United States Patent [19]
Ruff

[11] Patent Number: 5,975,822
[45] Date of Patent: Nov. 2, 1999

[54] QUICK-RELEASE FITTING FOR SECURING EQUIPMENT TO A TRACK OF T-SHAPED INTERNAL CHANNEL SECTION FOR AIRCRAFT

[75] Inventor: Stephen Anthony George Ruff, Chesham, United Kingdom

[73] Assignee: Martin-Baker Aircraft Company Limited, United Kingdom

[21] Appl. No.: 09/056,540

[22] Filed: Apr. 8, 1998

[30] Foreign Application Priority Data

Jul. 25, 1997 [GB] United Kingdom .................. 9715785

[51] Int. Cl.⁶ .................................................. F16B 21/00
[52] U.S. Cl. ........................ 411/553; 411/85; 403/322.4; 292/218
[58] Field of Search .............................. 411/550–553, 84, 411/85; 403/322.4, 321, 325; 292/218, 207

[56] References Cited

U.S. PATENT DOCUMENTS

| | | | |
|---|---|---|---|
| 1,810,351 | 6/1931 | Hines | 292/207 |
| 5,062,752 | 11/1991 | Takaguchi | 411/552 |
| 5,123,795 | 6/1992 | Engel | 411/553 |
| 5,178,346 | 1/1993 | Beroth . | |
| 5,271,586 | 12/1993 | Schmidt | 411/85 |
| 5,302,065 | 4/1994 | Vogg | 411/553 |
| 5,593,265 | 1/1997 | Kizer | 411/553 |

FOREIGN PATENT DOCUMENTS

| | | |
|---|---|---|
| 812734 | 4/1959 | United Kingdom . |
| 815009 | 6/1959 | United Kingdom . |
| 1246705 | 9/1971 | United Kingdom . |
| 2250431 | 6/1992 | United Kingdom . |
| 2 267 120 | 11/1993 | United Kingdom . |

*Primary Examiner*—Flemming Saether
*Attorney, Agent, or Firm*—Fulwider Patton Lee & Utecht, LLP

[57] ABSTRACT

A quick release fitting for securing equipment, such as seating, to floor or ceiling tracks of T-shaped internal channel section comprises a first member securable to the seating and a second member rotatable through a quarter turn in the first member, the second member including a T-shaped end complementary in shape with the channel and engageable therein by insertion in the channel with the cross-member of the "T" extending along the channel and subsequently turning the second member through a quarter turn. An alternative, retractable fitting comprises a body portion adapted to be fitted in a floor structure and a captive insert member held captive in a bore in the body portion and movable between a retracted position flush with the upper surface of the floor structure and an upper, projected, position for engagement with a seat mounting for example, the insert member being spring biased towards its projected position and being retainable in its retracted position by cooperating bayonet formations on the body portion and insert member.

3 Claims, 3 Drawing Sheets

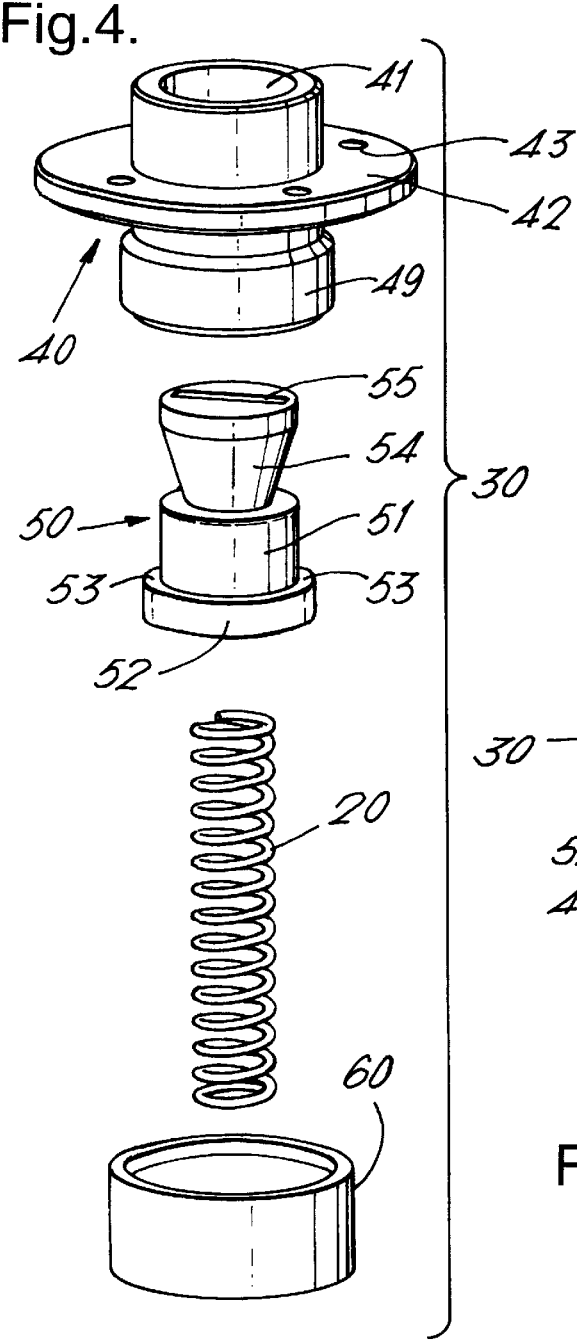
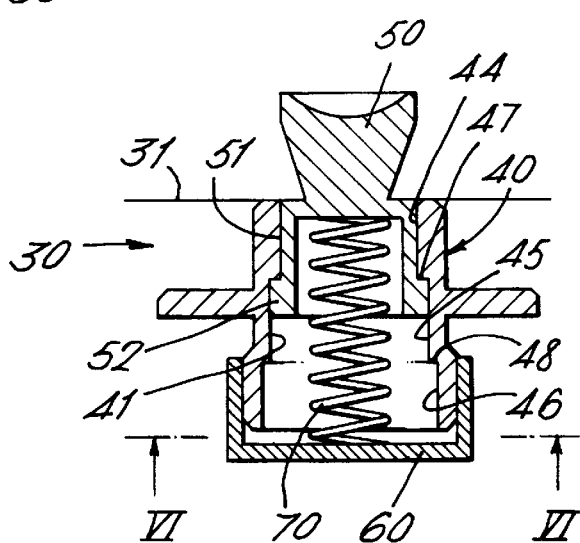
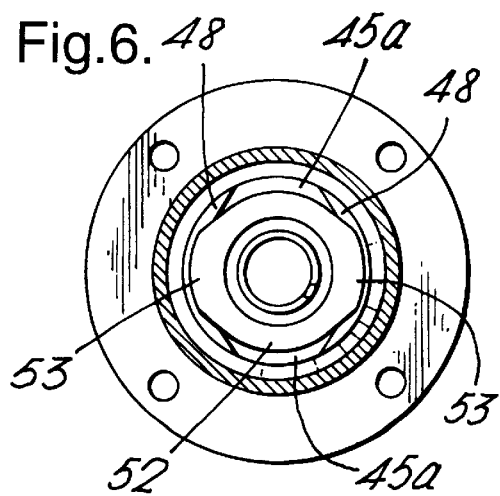

QUICK-RELEASE FITTING FOR SECURING EQUIPMENT TO A TRACK OF T-SHAPED INTERNAL CHANNEL SECTION FOR AIRCRAFT

THIS INVENTION relates to fittings for releasably securing seating and other equipment in aircraft.

In the manufacture and fitting out of aircraft there is frequently a need for fittings which will allow seating or other equipment to be releasably mounted in any of a number of selectable locations, for example because different purchasers of the same basic aircraft model may require different seating or equipment arrangements or because owners or operators of aircraft may require different arrangements of seating or other equipment at different times in the same aircraft.

It is among the objects of the present invention to provide improved fittings meeting this need.

According to one aspect of the invention there is provided a quick-release fitting for securing equipment, such as seating, to floor or ceiling tracks of inverted T-shaped internal channel section, as herein defined, in an aircraft, comprising a first member adapted to be secured to such equipment and having mounted thereon, for rotation about an axis, a second member having an end portion, of complementary T-shape, for engagement in such track, said axis extending along the stem of the "T" whereby the second member, in a first position thereof in which the arms of the "T" extend in the longitudinal direction of such track can be inserted in such track and the second member can thereafter be turned through 90° about said axis into a second position to lodge the arms of the "T" shaped second member into the regions of the interior of the channel section track providing the arms of such cross-section.

Preferably, the fitting including catch means operable manually to retain said second member in said second position thereof. The expression "T" shaped as used herein is intended to encompass, in addition to strictly "T" shaped formations, any formation which has a head or end which is wider than a stem or narrower portion and thus, for example, is intended to cover dovetail shapes.

In a variant of the first mentioned embodiment of the invention, the second rotatable member is replaced by a bifurcated member defining two limbs each providing a respective part of a longitudinally divided stem portion co-axial with said first member and accommodated therein, each said limb extending from one end of the first member and providing a respective foot or transversely extending arm for engagement in a respective portion of such "T" section channel providing a respective "limb" of the "T" cross section, said limbs of the bifurcated member being arranged for lateral displacement or pivoting relative to each other between a narrower condition in which said feet together form a structure sufficiently narrow to allow such structure to be introduced into such a "T"-section channel through the restricted mouth of such a channel, and a wider condition in which said feet are displaced apart from each other so as to snugly engage in the arm regions of such "T"-shaped cross section to prevent withdrawal of such feet from the "T"-section channel. In this variant the fitting preferably includes a wedge or taper member which is located between said limbs of the bifurcated member and is displaceable manually, e.g. by an operating handle extending through a longitudinal slot in the wall of a hollow cylindrical part of said first member receiving said limbs of the bifurcated member, whereby the wedge can be moved between a position allowing said feet to be close together for insertion into said channel and a position forcing said feet apart. In this variant, the limbs of said bifurcated member are preferably resiliently urged towards one another either by the inherent resilience of the bifurcated member where this is a one-piece construction or by separately formed spring means. Catch means is again preferably provided for the operating handle, such catch means being manually operable.

According to another aspect of the invention there is provided a retractable fitting suitable for fitting to a floor of an aircraft for mounting seating or other equipment in the aircraft, and comprising a first, body portion adapted to be secured to, or in, floor structure so that an end region of said body portion is generally flush with the outer surface of such floor structure, a bore extending into said first member from said exposed end, an insert member held captive within said first member and movable between a retracted position in which it does not project significantly from said first member and an extended position in which it projects from said first member to provide a mounting formation to which seating or other equipment may be secured.

Figure 3:
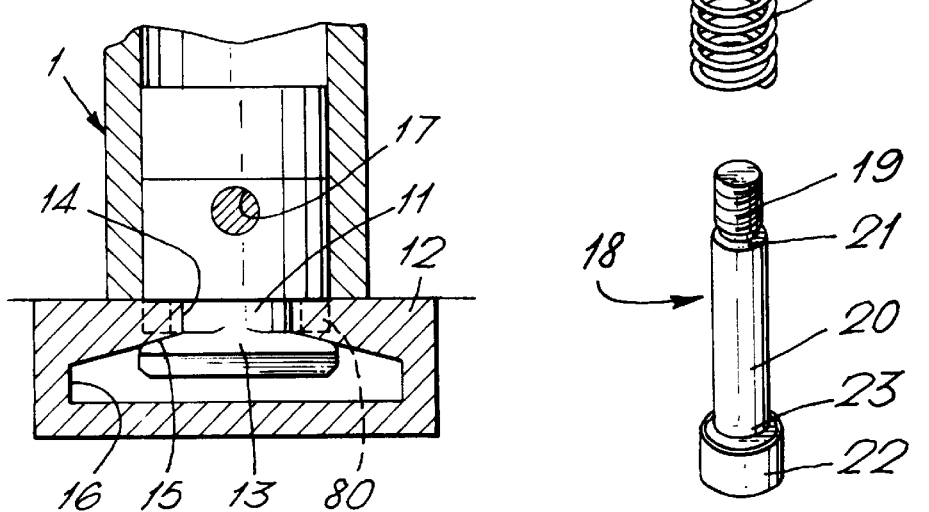
Figure 2:
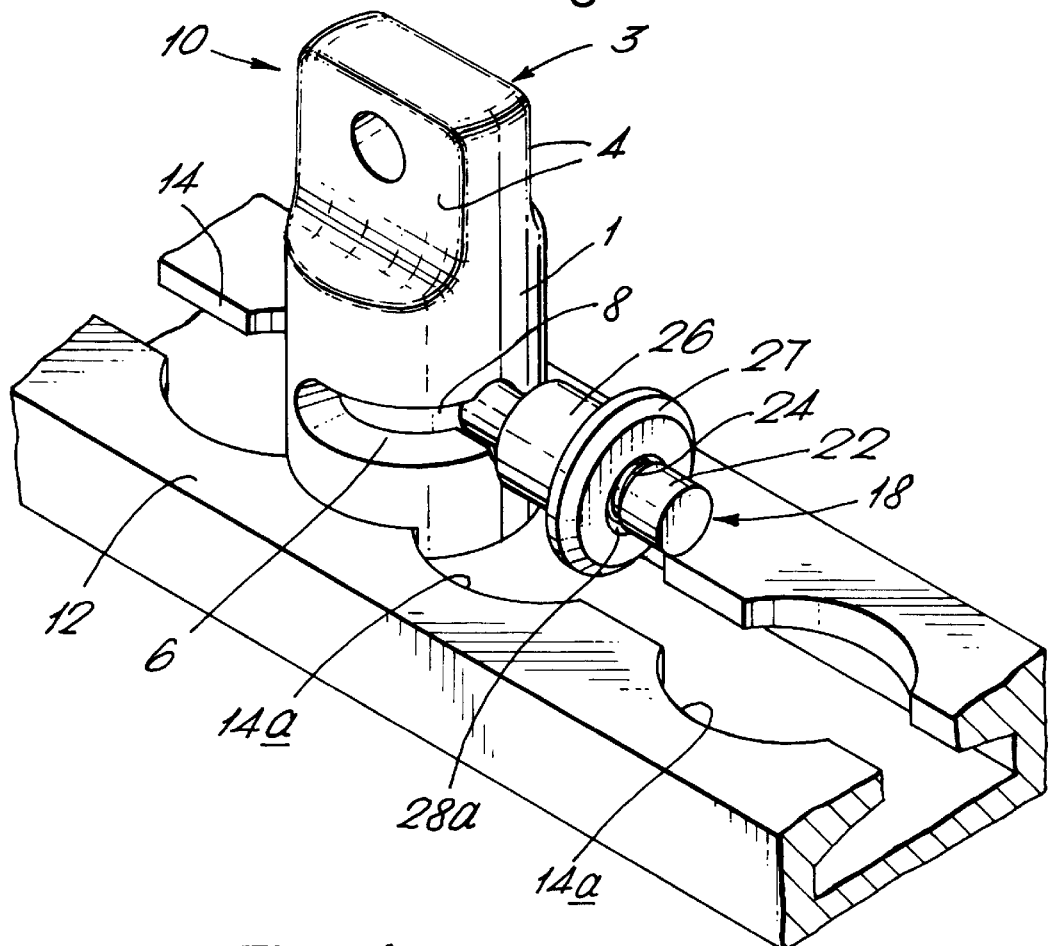
Figure 3A:
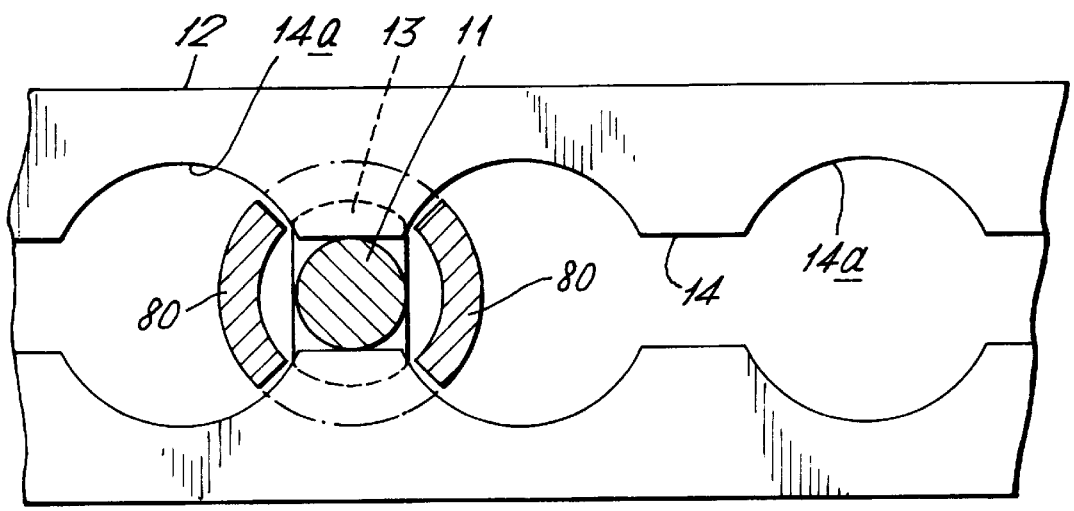

Embodiments of the invention are described below by way of example with reference to the accompanying drawings in which:

FIG. 1 is an exploded perspective view of one fitting embodying the invention,

FIG. 2 is a perspective view showing the fitting of FIG. 1 assembled and fitted to a channel in the floor of an aircraft, FIG. 3 is a fragmentary cross-sectional view of the mounted fitting of FIG. 2, FIG. 3A is a schematic view in horizontal section through the of assembly of FIG. 2, FIG. 4 is an exploded perspective view of another form of fitting embodying the invention, FIG. 5 is a vertical section view showing the fitting of FIG. 4 assembled and mounted in the floor of an aircraft and FIG. 6 is a view in section along the lines VI—VI of FIG. 5.

Referring to FIGS. 1 to 3A, and more particularly to FIGS. 2 and 3, a detachable fitting 10 is shown in FIG. 2 upstanding from the floor of an aircraft, the base of fitting 10 being engaged, in a fashion to be described, in a mounting channel 12 set in the floor of the aircraft and having the form of a channel of generally "T"-shaped internal cross-section, with a restricted mouth 14 substantially narrower than its interior 16, but having, at regular intervals along the top of the channel, circular cut-outs 14a, centred on the middle of the channel and extending over the channel so that as shown in FIGS. 2 and 3A, the opposing edges of the mouth of the channel are scalloped. As shown in FIG. 3, in the mounted condition of the fitting 10, a foot 13 of cross-section complementary with the channel and extending from the fitting 10, is engaged in the T-section channel at one of the regions where the channel mouth is narrower, between adjacent circular cut-outs 14a.

Referring to FIG. 1, the fitting 10 comprises a body 1 which, over the greater part of its length, is in the form of a hollow cylinder having an internal cylindrical axial bore 2, the central axis of which extends vertically when the fitting is mounted in an aircraft cabin floor as illustrated in FIGS. 2 and 3. The body 1 terminates in a solid upper end 3 of substantially rectangular configuration providing two parallel flat side faces 4. A bore 5 for a mounting bolt or the like (not shown) extends through this upper end part 3 perpendicular to these parallel faces 4.

An arcuate slot 6 is formed through the wall of the hollow cylindrical portion of body 1. One end of arcuate slot 6 is slightly enlarged and formed into a part cylindrical recess 7.

The fitting 10 includes a second member in the form of a plunger 8, an upper portion of which is formed as a cylindrical body or journal portion 9 of a diameter sized to be a free rotating fit within the cylindrical axial bore 2 in the body 1. A diametral bore 17 is formed in the journal portion 9 of the plunger 8. In the preferred embodiment, diametral bore 17 is screw threaded. The plunger 8 has a stem 11 of reduced diameter extending downwardly therefrom and terminating in foot 13. As best seen in FIG. 1, the foot 13 has a major dimension, measured along one diameter perpendicular to the central axis of the assembly, which corresponds substantially to the width of the widest part 16 of channel 12 and has a minor dimension, measured along a perpendicular diameter, which is slightly less than the width of the restricted mouth portion 14 of the channel 12. The major dimension of foot 13 also corresponds substantially to, or is somewhat less than the outside diameter of the cylindrical part of body 1, and thus does not project beyond a notional extension of the cylindrical surface of body 1.

An operating lever 18 in the form of a bolt, extends through the arcuate slot 6 in the wall of the hollow portion of member 1 and is secured to the journal portion 9 of plunger 8 to extend radially therefrom with respect to the vertical axis of the assembly. In the preferred embodiment, the inner end of bolt 18 is screw-threaded, at 19, and is screw-threadedly engageable in the complementary screw-threaded diametral bore 17 in the journal portion 9 of plunger 8. The diameter of screw-threaded portion 19 is somewhat less than that of the major shank portion 20 of bolt 18 so that a first annular shoulder 21 is formed between the screw threaded portion 19 and the shank portion 20, which abuts a corresponding shoulder provided in the bore 17 in the plunger 8 when the bolt 18 is screwed up tight within the diametral bore 17.

At its outermost end, the bolt 18 has an enlarged cylindrical head 22 which defines a second annular shoulder 23 around the shank portion 20.

The bolt 18 provides a means whereby the plunger 8 may be rotated through one quarter-turn within the body 1.

Mounted on the shank portion 20 of bolt 18 are a helical compression spring 24 and a catch means in the form of a retaining sleeve 25. The sleeve 25 comprises a generally cylindrical sleeve body 26 terminating at its outer end in an annular flange 27 and having a central axial through bore 28 sized to slidably receive the shank 20 of bolt 18. The spring 24 fits closely over the shank 20 of bolt 18 and at its outermost end bears against the head 22 of bolt 18 and is received, at its innermost end, in a counterbore 28a, coaxial with through bore 28 but of larger diameter and shorter length, in sleeve 25. The shank 20 of bolt 18 extends as a free sliding fit through the through bore 28.

As will be noted from FIG. 1, the end of sleeve 25 remote from flange 27 is of reduced external diameter, at 29, relative to the remainder of the cylindrical body 26 of sleeve 25. Reduced diameter portion 29 of sleeve 25 is dimensioned to be received within part-cylindrical recess 7 of arcuate slot 6.

The length of the bolt 18 and spring 24 relative to the sleeve 25 are such that the sleeve 25 may be moved radially outwardly relative to body 1 along bolt 18 sufficiently to move the inner end of sleeve 25 outwardly beyond the periphery of body part 1 to allow the bolt 18 and with it spring 24 and sleeve 25 to be rotated around the central axis of body 1, through the angular range permitted by the arcuate slot 6, thereby rotating the plunger 8.

The arrangement is further such that when the bolt 18 is in its angular position relative to the body 1 in which the sleeve 25 is aligned with said enlarged part-cylindrical recess 7, if the sleeve 25 is released from any manually applied countering force, the spring 24, acting between the head 22 of the bolt 18 and the sleeve 25, will urge the sleeve 25 radially inwardly into a position in which the reduced diameter inner end portion 29 engages in said enlarged part-cylindrical recess 7 portion of the arcuate slot 7, thereby preventing angular displacement of the bolt 18 along the arcuate slot 7 accidentally and without first deliberately withdrawing the sleeve 25 radially outwardly.

The configuration of the sleeve 25 and the bolt 18 allows such withdrawal against the bias applied by the spring 24 to be effected by engaging the end of the head 22 of the bolt 18 by the thumb, extending the first and second fingers of the hand behind the flange 27 on either side of the sleeve body 26 and pressing these fingers towards the thumb thereby, in effect, pushing the head portion 22 of the bolt 18 into the radially outer end of the counterbore 28a in the sleeve 25, prior to swinging the bolt 18 around in the body 1.

It will be understood that, in use, the locked position of the device in which the reduced diameter inner end 29 of the sleeve 25 is engaged in the enlargement 7 at the end of the arcuate slot 6 corresponds to the position in which the foot 13 has its greatest width aligned with the transverse direction in the channel 12 so that the body 1 is secured to the channel 12. It will be understood also that usually the upper end of the body 1 will be secured to a seating assembly or other equipment. As shown in FIG. 1, the lower end of member 1 has, projecting downwardly, arcuate extensions 80 arranged diametrally opposite one another with respect to the vertical axis of the member 1 and each extending through approximately 90° about that axis, the radially outer surfaces of extensions 80 lying on the same notional cylinder as the majority of the remainder of the member 1, each extension 80 having a parallel radially inner surface and terminating at its circumferential ends in respective flat end faces lying in respective radial planes, (i.e. planes containing the vertical axis of the member 1). In the assembled condition of the device, the upper surface 15 of the foot 30 lies somewhat below the level of the axial end faces of the extensions 80. The length of each extension 80 and the spacing of these extensions apart is such that with the foot 13 aligned so that its longer dimension extends along a diameter passing through the middle of each extension 80 and extending in the longitudinal direction of the channel, the member 1 can be lowered into a position on the channel in which each extension 80 extends into a different one of two adjoining circular cut-outs 14a, with the rotary axis of foot 13 extending through the narrower portion of the channel mouth between these two circular cut outs, until the foot 13 lies below the level of the webs which define such narrower mouth portion, whereafter the foot 13 is rotated through 90° about the vertical axis of body 1 by means of the operating lever 18 to underlie the upper webs defining the channel mouth and prevent upward withdrawal of the member 1. As best shown in FIG. 3A, which is a schematic sectional view at substantially the level of the upper surface of the channel, in this position, the circumferential ends of the extensions 80 engage, or directly oppose, adjacent portions of the peripheral edges of the respective circular cut outs 14a, thereby preventing longitudinal or transverse movement of the member 1 with respect to the channel. Thus, this configuration of the lower end of member 1, with the extensions 80, provides a shear plug which prevents lateral and radial movement.

The upper surface 15 of the foot 13 may be so formed, in relation to the channel 12, that as the plunger 8 is turned to its secured position, a camming action or wedging action takes place between the lateral portions of the foot 13 and the lateral regions of the channel 12 to ensure a tight and secure fit of the foot in the channel. Alternatively or additionally, the slot 6 may have a slight quasi-helical upward inclination towards the enlarged end 7 thereof so that a camming action takes place between the slot 6 and the bolt 18. Additionally, or alternatively, the journal portion 9 of body 1 may be externally screw-threaded, as indicated in FIG. 1, (but not in FIG. 3) to cooperate with a complementary screw-thread formed in the bore 2 in body 1 so that a corresponding camming action takes place between the thread on portion 9 and the thread in bore 2 as the plunger 8 is rotated.

Referring now to FIGS. 4 to 6, and more particularly FIGS. 4 and 5, an alternative form of retractable fitting 30 is shown. FIG. 5 shows, in section, this fitting fitted to the floor of an aircraft cabin. As described in more detail below, a first body portion 40 is secured to the floor structure in such a way that an uppermost end of body portion 40 is substantially flush with the floor surface (indicated at 31 in FIG. 5). An insert member 50, received within first body portion 40 projects from the floor surface in a first position, but is movable to a second position in which its uppermost end is also substantially flush with (or is below) the floor surface 31.

Referring in more detail to FIGS. 4 and 5, the first body portion or mounting element 40 is of generally cylindrical form defining an axial through bore 41 and having an outwardly extending annular flange 42, which serves to anchor mounting element 40 within the floor structure. Annular flange 42 is located approximately halfway along the axial length of mounting element 40 and has a number of mounting apertures 43 formed therethrough, to receive fixing screws, (not shown) for fixing the element 40 to the floor of the aircraft cabin, the axis of each mounting aperture 43 being substantially parallel to the main axis of mounting element 40.

As can be seen from FIG. 5, the axial through bore 41 has three discrete bore portions, referenced 44, 45, 46, each having a different diameter. Uppermost bore portion 44 extends from the upper end of member 40 and adjoins the larger diameter central bore portion 45, whilst central bore portion 45 adjoins the even larger, lowermost bore portion 46. A first downwardly facing annular shoulder 47 extends between bore portion 44 and 45. A second downwardly facing annular shoulder 48 extends between bore portion 45 and bore portion 42. First shoulder 47 is located adjacent the flange 41. The largest, lowermost bore portion 46 is formed within an annular collar 49 which on its exterior is stepped outwardly from the main body of the mounting element 40.

The internal configuration of central bore portion 45 is not, in fact, completely circular in section. A pair of diametrically-opposed recesses 45a (shown in FIG. 6) are formed as cut-outs in the main body of mounting element 40 and extend from shoulder 48 to shoulder 47. The width of the central bore portion 45, measured diametrally between the outermost surfaces of the opposed recesses 45a, may be, as shown, substantially equal to the diameter of lowermost bore portion 46, so that the second shoulder 48 actually takes the form of two opposed arcuate shoulder portions, as shown in FIG. 6.

The insert member 50 is vertically movable axially within the mounting element 40 and is rotatable within member 40 in said second position thereof. Insert member 50 has a central, cylindrical body portion 51 sized as a close sliding and rotating fit within the uppermost bore portion 44 of mounting element 40.

At its lowermost end, the insert member 50 has a retaining portion 52. Around the majority of its periphery, the retaining portion 52 has the form of a cylinder of a diameter such as to be a sliding fit within the central bore portion 45 of mounting member 40. In the raised, first position of member 50, an upwardly facing shoulder extending between portion 51 and portion 52 engages shoulder 47 to prevent removal of the insert member 50 from the mounting body 40 in the upward direction. In the preferred embodiment, retaining portion 52 is provided with two, diametrically opposed, projections 53. The diameter of retaining portion 52, measured diametrally between the outer surfaces of projections 53 is slightly less than the width of bore portion 45 measured between the outermost surfaces of recesses 45a formed in bore portion 45 of mounting element 40, and likewise slightly less than the diameter of bore portion 46.

At its uppermost end, insert member 50 is formed into a head portion 54 which, in the embodiment illustrated in the Figures, is of inverted frusto-conical form, widening upwardly to an uppermost co-axial cylindrical portion, in the upper surface of which is formed a transverse groove 55 intended to receive a screw-driver or like tool, for movement of the member 50 between its first and second positions, as described below. In a variant, (not shown), the head portion 54 may be of uniform-diameter cylindrical form throughout its height. Head portion 54 has a maximum diameter substantially equal to or slightly less than central body portion 51 and uppermost bore portion 44, so that head portion 54 may be pushed downwardly into the mounting body 40 such that head portion 54 is accommodated within uppermost bore portion 44 with none of the head portion 54 projecting above the surface 31 of the floor structure. Head portion 54 serves as mounting formation to which seating or other equipment may be secured. In an alternative embodiment, head portion 54 may be of generally cylindrical form and have a diametral through bore formed therein to facilitate attachment to seating or the like.

A cap 60 is threadedly engageable with the externally screw-threaded collar 49 of mounting element 40, and serves to close the lowermost open end of mounting element 40. A helical compression spring 70 extends into a blind axial bore extending from the lower end of member 50 and acts between the insert member 50 and cap 60 to bias the insert member upwardly with respect to the mounting member 40 and cap 60.

FIG. 5 illustrates the arrangement in which the member 50 is in its first or extended position in which the head portion of insert member 50 projects from the mounting member 40 and hence also projects above the outer surface 31 of the floor structure. In this condition, seating or other equipment may be secured to the head portion 54. When the member 50 is in this position, the projections 53 on the insert member 50 are located within the recesses 45a in the body portion 40, thereby preventing substantial rotation of insert member 50 within portion 40. Once the seating or other equipment has been removed from head portion 54, the member 50 may be moved to its retracted position as described below.

In order to move member 50 to its retracted positions a screw-driver or like tool may be engaged with the groove 55 and the member 50 pushed down substantially vertically with respect to the mounting member 40, so that the retaining portion 52 is moved out of engagement with first shoulder 47 to an intermediate position in which the retaining portion 52 is located slightly below the arcuate portions of second shoulder 48. In this intermediate position the projections 53 are located vertically below respective recesses 45a. When in this intermediate position, the insert member 50 may then be rotated so that each projection 53 is moved to a position in which it is located substantially vertically below a respective arcuate portion of second shoulder 48. Upon disengagement of the tool from member 50 in this position, the upward movement of member 50 under the bias of the spring is halted by engagement of projections 53 with shoulder 48 so that the insert member 50 is held in its retracted position in which the uppermost surface of head portion 54 is substantially flush with or located slightly below the outer surface 31 of the floor structure. FIG. 6 shows the arrangement in this position.

The arcuate portion of second shoulder 48 may be formed with respective recesses or indents (not shown) of a size to partly receive respective projections 53. Such recesses or indents may therefore serve to prevent accidental rotation of insert member 50 when in the retracted position, the projections 53 being held in such recesses by the upward bias provided by spring 70.

It will be understood from the above that the member 50 is mounted in member 40 by what is effectively a bayonet fitting, although it does not permit removal of member 50 from member 40.

I claim:

1. A quick-release fitting for securing equipment to a track of T-shaped internal channel section, in an aircraft, said internal channel section having upper inner surfaces which slope outwardly and downwardly, comprising:

a first member adapted to be secured to the equipment, said first member having an arcuate slot in a wall of said first member;

said first member having mounted thereon, for rotation about an axis, a second member having an end portion, of complementary T-shape, for engagement in the track, said T-shaped end portion having laterally extending arms having upper surfaces which slope outwardly and downwardly, said axis extending along the stem of the "T" whereby the second member, in a first position thereof in which the arms of the "T" extend in the longitudinal direction of the track can be inserted in the track and the second member can be thereafter be turned through 90° about said axis into a second position to lodge the arms of the "T" shaped second member into the regions of the interior of the channel section track providing arms of such cross-section, whereby a camming action is produced to clamp the fitting firmly in said channel of said track as said second member is rotated to said second position; and an operating lever extending radially from said second member, through said arcuate slot in a wall of said first member, whereby the second member can be moved manually between its first position and its second position said operating lever being operable manually to retain said second member in said second position thereof.

2. A quick-release fitting according to claim 1 wherein said channel of said track has a plurality of upper circular cutouts along said channel, and said first member includes a pair of opposing downwardly projecting arcuate extensions adapted to interfit with said upper circular cutouts of said channel, to thereby prevent lateral and radial movement of the first member with respect to the channel of the track.

3. A quick-release fitting according to claim 1, wherein said first member includes a surface defining a bore for securing said equipment in said aircraft, said second member includes a generally cylindrical journal portion which has said axis as its central axis and which is rotatable received in a complementary bore in said first member and which projects from said bore to said T-shaped end portion, and said operating lever further comprises a locking collar slidable along said operating lever and spring-biased towards said wall of said first member whereby, in said second position said locking collar can be urged, by said spring bias, radially inwardly along said operating lever to engage a radially inner portion of said locking collar in a recess in said wall of the first member, thereby to prevent rotation of said lever and said second member about said axis until said locking collar is withdrawn manually radially outwardly, against said spring bias, along said operating lever.

\* \* \* \* \*